United States Patent [19]
Kurosaki et al.

[11] Patent Number: 5,828,715
[45] Date of Patent: Oct. 27, 1998

[54] FUEL RODS, ITS MANUFACTURING METHOD AND FUEL ASSEMBLY

[75] Inventors: Hideki Kurosaki, Hitachi; Kenichi Ito, Hitachinaka; Masana Sasaki, Hitachi; Kensuke Tokunaga, Tokahagi, all of Japan

[73] Assignees: Hitachi, Ltd., Tokyo; Hitachi Engineering Co., Ltd., Ibaraki, both of Japan

[21] Appl. No.: 694,667

[22] Filed: Aug. 9, 1996

[30] Foreign Application Priority Data

Aug. 22, 1995 [JP] Japan .................................. 7-213242

[51] Int. Cl.⁶ ........................................................ G21C 3/00
[52] U.S. Cl. ........................... 376/409; 376/416; 376/457
[58] Field of Search .................................... 376/409, 410, 376/414–419, 457, 347, 421; 427/6, 239; 976/DIG. 53

[56] References Cited

U.S. PATENT DOCUMENTS

| | | | |
|---|---|---|---|
| 4,664,881 | 5/1987 | Ferrari et al. | 376/410 |
| 4,671,927 | 6/1987 | Alsop | 376/419 |
| 4,683,114 | 7/1987 | Ho et al. | 376/419 |
| 4,822,559 | 4/1989 | Mogard | 376/415 |
| 4,869,866 | 9/1989 | Lay et al. | 376/421 |
| 4,933,136 | 6/1990 | Foster et al. | 376/416 |
| 5,257,298 | 10/1993 | Yuda et al. | 376/421 |
| 5,341,407 | 8/1994 | Rosenbaum et al. | 376/409 |
| 5,383,228 | 1/1995 | Armijo et al. | 376/409 |

FOREIGN PATENT DOCUMENTS

| | | | |
|---|---|---|---|
| 1-193691 | 8/1989 | Japan | 376/421 |
| 3-146895 | 6/1991 | Japan . | |
| 5-011088 | 1/1993 | Japan | 376/421 |
| 6-094876 | 4/1994 | Japan . | |
| 7-077589 | 3/1995 | Japan . | |

*Primary Examiner*—Michael J. Carbone
*Assistant Examiner*—Matthew J. Lattig
*Attorney, Agent, or Firm*—Antonelli, Terry, Stout, & Kraus, LLP

[57] ABSTRACT

Fuel rod 2 has a fuel cladding tube 3, and upper end plug 5 and a lower end plug 6 welded to the ends of fuel cladding tube 3. He gas 1 and U pellets 4 are filled in the fuel cladding tube 3. The He gas pressure 1 is about 8 atm, and the average crystal grain size of the U pellet 4 is in the range of 30–60 $\mu$m. The fuel rod can be manufactured at a lower manufacturing cost, while maintaining the fuel integrity the same as in a conventional fuel rod.

19 Claims, 7 Drawing Sheets

FUEL RODS, ITS MANUFACTURING METHOD AND FUEL ASSEMBLY

BACKGROUND OF THE INVENTION

The present invention is related to nuclear fuel to be loaded in a core of a nuclear reactor, and especially to fuel rods suitable for a boiling water type nuclear reactor and a fuel assembly of a boiling water type nuclear reactor.

Generally, uranium oxide fuel rods of fuel assemblies loaded in a boiling water type nuclear reactor are filled with pellets of uranium oxide or pellets of uranium oxide mixed with a small quantity of neutron poison and helium (He) gas. This is done for the following reasons. As burning proceeds, a fission product gas with a low heat transfer rate is emitted from the pellets to the internal space of the fuel rods. In order to prevent the reduction in heat transfer between the pellets and the cladding tubes caused by the generation of the fission product gas, He gas with a high heat transfer rate is filled therein. Because a rising of the pellet temperature is suppressed and emission of the fission product gas is repressed to a low level in this way, a further decrease in the above-mentioned heat transfer can be prevented. That is, the larger the quantity of He gas is, the smaller will be any influence on a decrease of the heat transfer by the fission product gas. Therefore, from the view point of good heat transfer, the He gas pressure should be as high as possible at the time of manufacturing the fuel rods. However, if the He gas pressure is too high, the increase of the He gas pressure becomes larger than the decrease of the quantity of the fission product gas being generated so that the inner pressure of the fuel rods at the end of fuel life becomes higher. This is an adverse effect from the view point of fuel integrity.

As a result, there exists an optimum point for the He gas pressure. This optimum point depends on the burnup of the fuel. The He gas pressure has been set at 5 atm in the conventional (8×8) fuel assembly in which the fuel rods were arranged in 8 lines×8 lines. Recently, in the 9×9 fuel assembly that aims at a high burnup to further improve the fuel economy, the He gas pressure is set at about 10 atm. In the above-mentioned conventional fuel rods, the following problems exist. In a case of pressurizing and filling the fuel rods with He gas, the He gas pressure is relatively low (5 atm) in the conventional 8×8 fuel assembly, and so it was possible to fill He gas in the cladding tube and to weld the upper end plug simultaneously. In the 9×9 fuel assembly for high burnup, the He gas pressure is increased to about 10 atm nowadays, making it difficult to control the welding arc and the formation of pores in the weld, so that welding by the conventional method is difficult. Therefore, an addition of a new welding method and a separate process for pressurizing the He gas has become necessary. These processes are not suitable from the economical point of view because these processes cause the manufacturing cost to increase. Because He gas is high-priced (expensive), an increase in the quantity of the pressurized He gas makes the manufacturing cost increase.

On the other hand, as a means to prevent an increase in the inner pressure of the fuel rods, a method of providing a plenum in the upper part of each of the fuel rods have been adopted, where the pellets are not filled. However, it is not desirable to increase the volume of the plenum, because that leads to a decrease in the loading quantity of the U pellets or causes a decline in the design margin against the expansion resilience, which absorbs the difference of expansion between the fuel rods of the fuel assembly.

Another method is described in Japanese patent Laid-open print No. 1-193691, the Japanese patent Laid-open print No. 3-146895 and the Japanese patent Laid-open print No. 5-11088, wherein the crystal grain size of the pellets is increased by adding alumina silicate to the U pellets, and the emission from the pellets of the fission product gas is suppressed. However, in the prior art, neither the He gas pressure at the time of manufacturing the fuel rods nor the manufacturing cost thereof were considered.

SUMMARY OF THE INVENTION

It is an object of the present invention to provide fuel rods, a method of manufacturing the fuel rods and a fuel assembly using the fuel rods that can be produced at a lower manufacturing cost and can aim at high burnup, while maintaining the fuel integrity.

To achieve the above object, in a first aspect of the invention, nuclear fuel pellets having an average crystal grain size in the range of 30–60 $\mu$m, and helium (He) gas at a pressure in the range of 1–8 atm are filled in the fuel rods.

In a second aspect of the present invention, nuclear fuel pellets having an average crystal grain size in the range of 30–60 $\mu$m and argon (Ar) gas at a pressure in the range of 0.5–1.5 atm are filled in the fuel rods.

In a third aspect of the present invention, nuclear fuel pellets having a crystal grain size in the range of 30–60 $\mu$m and a mixed gas containing He and Ar at a total pressure in the range of 1–8 atm, wherein the partial pressure of Ar gas is 1.5 atm or less, are filled in the fuel rods.

According to the first aspect, the average crystal grain size of the nuclear fuel pellets is set at a 30–60 $\mu$m range, and the filled He gas pressure is set at a 1–8 atm range. As a result, as mentioned later by way of FIG. 4, the inner pressure of the fuel rods at the end of fuel life can be suppressed to the same level as that of a conventional fuel rod, and the upper end plug can be welded easily. Accordingly, while maintaining conventional fuel integrity, the manufacturing cost of the fuel rods can be reduced, and a high burnup can be expected.

According to the second aspect, the average crystal grain size of the nuclear fuel pellets is set to the range of 30–60 $\mu$m, and the filling pressure of the Ar gas is set to the range of 0.5–1.5 atm. As a result, as mentioned later by way of FIG. 8, the inner pressure of the fuel rods at the end of fuel life can be suppressed below the same level as that of a conventional fuel rod, and the upper end plug can be welded easily. Accordingly, while maintaining the fuel integrity, the manufacturing cost of fuel rods can be reduced and high burnup can be expected.

According to the third aspect, the fuel rods are filled with nuclear fuel pellets having an average crystal grain size in the range of 30–60 $\mu$m and a mixed gas containing He and Ar at a total pressure in the range of 1–8 atm, wherein the partial pressure of the Ar gas is 1.5 atm or less. As a result, the same effects as the first and second aspects can be achieved.

DETAILED DESCRIPTION OF THE PREFERRED EMBODIMENT

Figure 1:
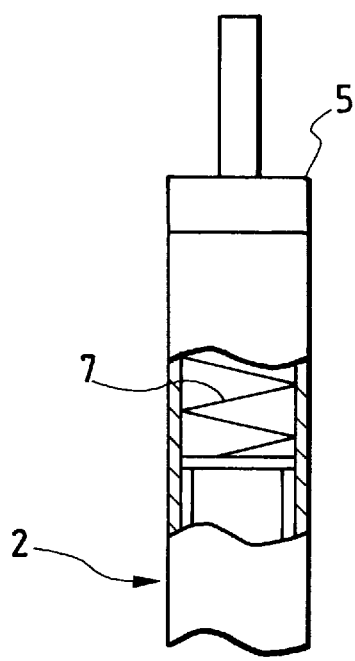
FIG. 1 is a partially broken-away side view of a first example of the fuel rod of the present invention.
Figure 1:
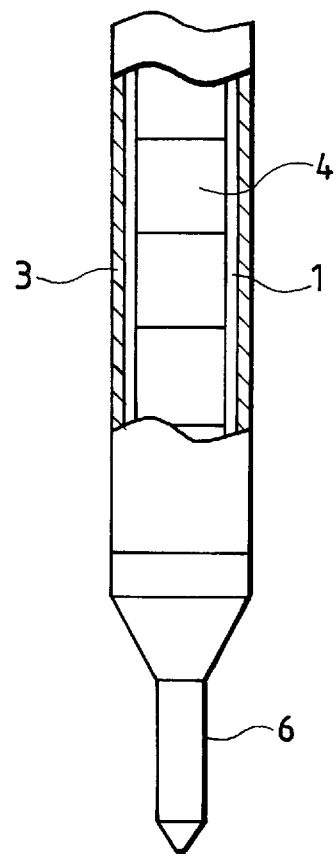
Figure 2:
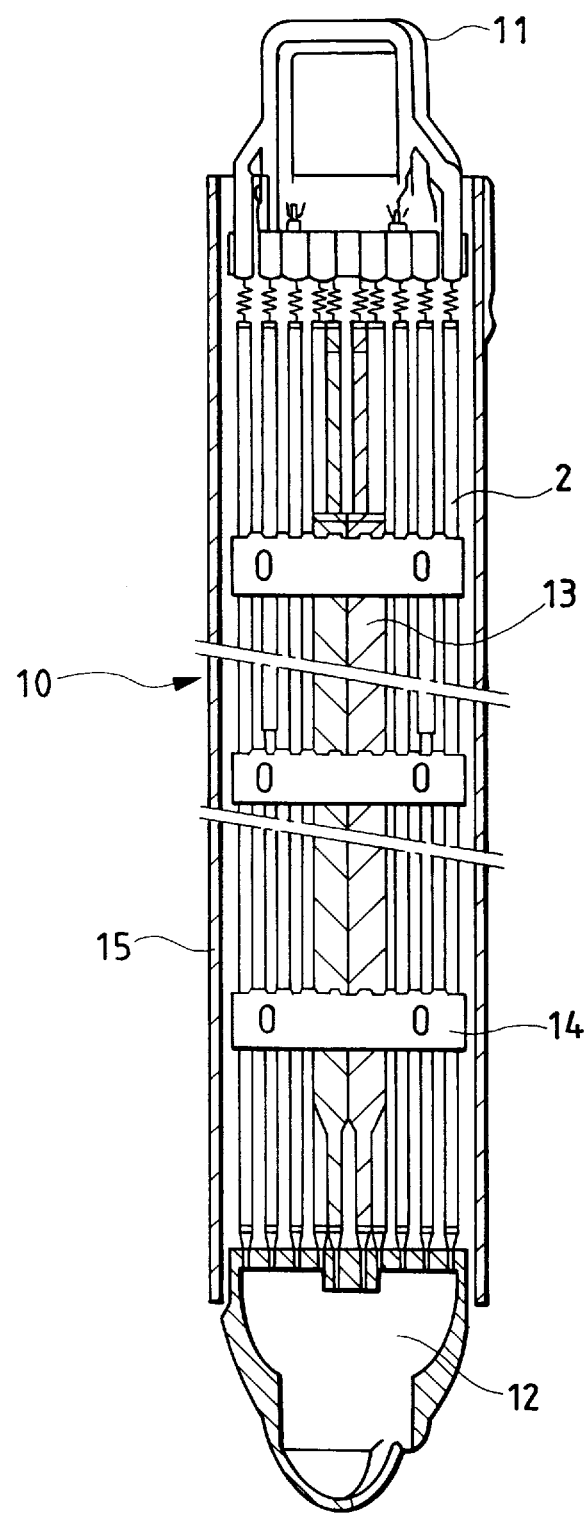
FIG. 2 is a vertical sectional view of the fuel assembly loaded with the fuel rods of the present invention.
Figure 3:
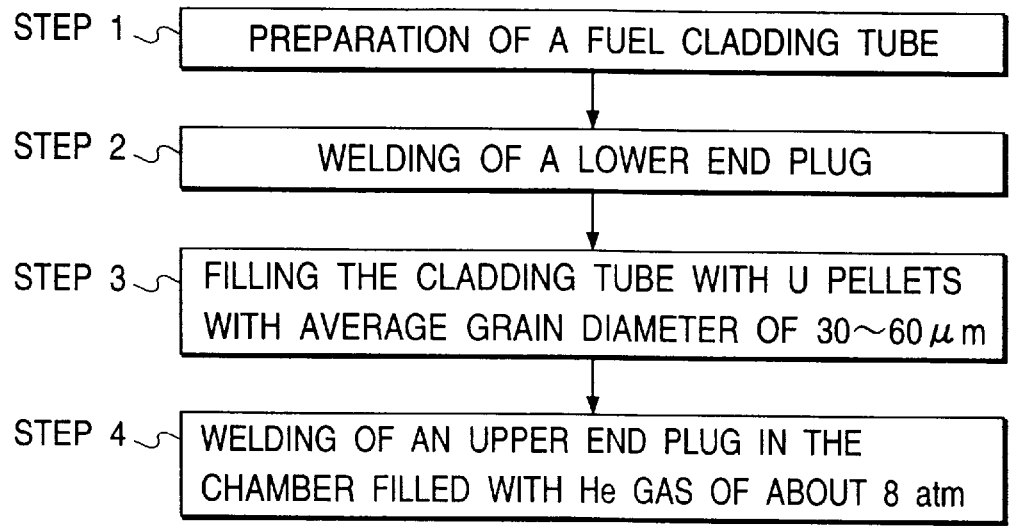
FIG. 3 is a diagram showing a method of manufacturing the fuel rod of FIG. 1.

Embodiments of the present invention will be explained by reference to, the drawings. The first example of the present invention will be explained by reference to FIGS. 1–3. FIG. 1 is a partially broken-away side view of the first example of the fuel rod of the present invention. FIG. 2 is a vertical sectional view of the fuel assembly loaded with the fuel rods according to the present invention. FIG. 3 is a diagram showing a method of manufacturing the fuel rod of FIG. 1. This example relates to a fuel rod in which He gas is filled in the cladding tube.

As shown in FIG. 2, the fuel assembly 10 is composed of fuel rods 2, water rods 13, upper tie plate 11 for holding the upper ends of the fuel rods 2, lower tie plate 12 for holding the lower ends of the fuel rods 2, a fuel spacer 14 which maintains a gap between the adjoining fuel rods 2, and a channel box 15 that surrounds the fuel rods 2 installed in the upper tie plate 11. A plurality of fuel spacers 14 are arranged in the axial direction of the fuel assembly 10 and are held by water rod 13. Lower tie plate 12 is provided with fuel rod supporting parts that support the lower ends of the fuel rods 2 and the water rods 13, and internal spaces are positioned beneath the supporting parts of the fuel rods.

The detailed structure of the fuel rods 2 loaded on fuel assembly 10 and its manufacturing method now will be explained. In step 1 of FIG. 3, a fuel cladding tube 3 made of zirconium alloy is prepared. In step 2, the lower end plug 6 is welded to the fuel cladding tube 3. In step 3, a plurality of uranium (U) pellets 4 having an average crystal grain size of 30–60 $\mu$m are filled in the fuel cladding tube 3. In step 4, He gas 1 is substituted for the internal gas, such as air, in the fuel cladding tube 3 in a welding chamber, and the He gas is pressurized to about 8 atm. The upper end plug 5 is welded to the fuel cladding tube 3 in the chamber in which about 8 atm He gas is filled, and the U pellets 4 are held by the plenum spring 7, so that the fuel rods 2 are sealed. As a result, the internal space of the fuel rods 2 is filled with about 8 atm of He gas 1 at room temperature. The U pellets 4 having an average crystal grain size of 30–60 $\mu$m were prepared by adding about 250 ppm of alumina silicate to the uranium fuel, and sintering them at about 1750° C. The U pellets 4 also can be made by other methods, such as one where the sintering temperature is increased without adding alumina silicate.

The index of the integrity of the fuel rods at the end of the fuel life is a sum of the inner pressure of the He gas in the cladding tube and the pressure of the fission product gas generated by the burnup of the nuclear fuel pellets. When the filling pressure (hereinafter referred to as the He filling pressure) of the He gas at the time of manufacture of the fuel rods is relatively small, the pellet temperature rises due to occurrence of fission product gases with a small heat transfer rate, and a rise of the pellet temperature generates further fission product gases. That is, in this case, the lower the He filling pressure is, the higher will be the pressure of the fission product gases and the inner pressure of the fuel rods at the end of fuel life. In other words, the higher the He filling pressure is, the lower will be the inner pressure of the fuel rods at the end of fuel life.

On the other hand, when the He filling pressure becomes high to some extent, the pressure increase (an increase of the He filling pressure) becomes larger than the pressure decrease due to a reduction of the quantity of the fission product gases being generated. Accordingly, the higher the He enclosure pressure is, the higher will be the inner pressure of the fuel rods at the end of fuel life.

Figure 4:
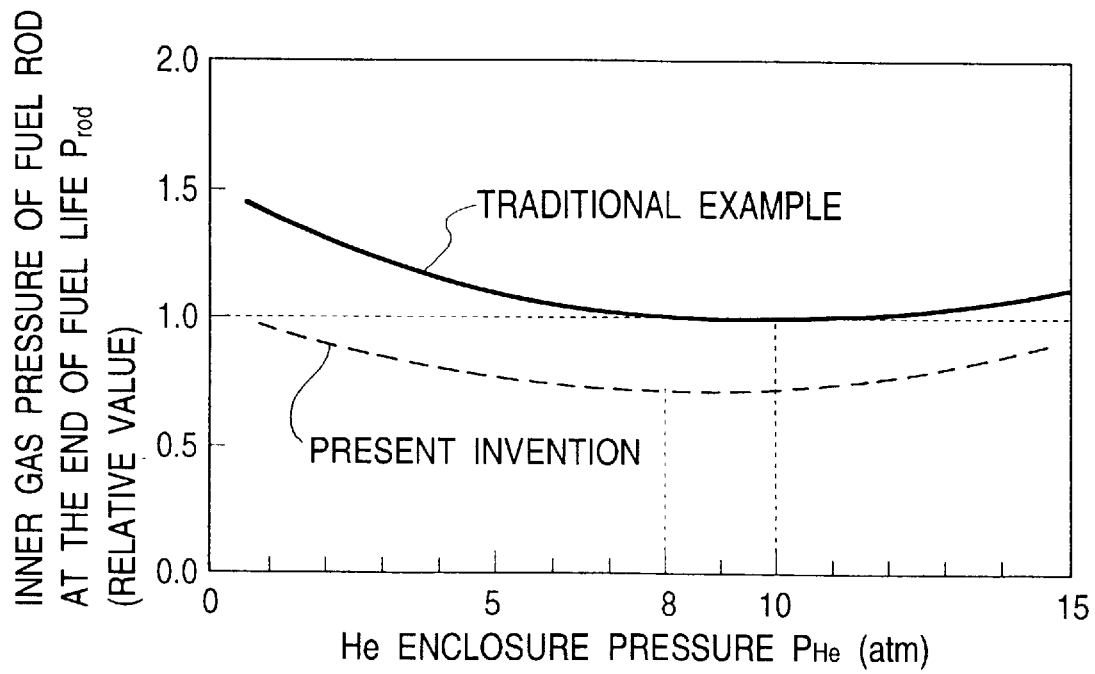
FIG. 4 is a diagram showing an example of an analysis of the relation between the filled He pressure and the inner pressure of the fuel rod at the end of fuel life.

Based on the above facts, the inner pressure Prod of the fuel rods at the end of fuel life declines first to the lowest level followed by an increase in the He filling pressure $P_{He}$. An analysis of the determining relationship between the pressures $P_{He}$ and Prod is shown in FIG. 4, which relates to an analysis wherein the fuel assembly of the present invention, including fuel rods filled with U pellets having an average crystal grain size is 30–60 $\mu$m, and a fuel assembly of the conventional example, including fuel rods filled with U pellets having an average crystal grain size of 10–20 $\mu$m, are burned to a burnup of about 55 GWd/t. From FIG. 4, it is clear that the pressure Prod of the present invention can be lowered even more, compared with the conventional example. This is because an increase in the average crystal grain size allows the gas holding quantity increase when the crystal grain size of the U pellets increases, so that the quantity of the fission product gas being generated decreases.

Figure 5:
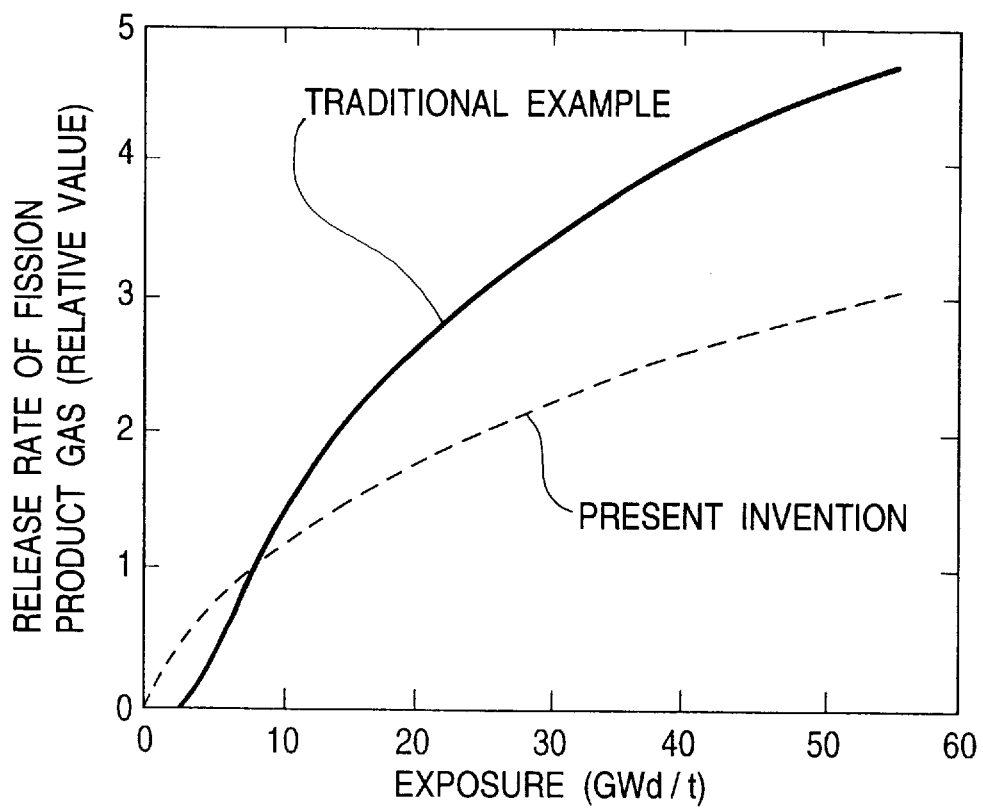
FIG. 5 is a diagram showing an example of an analysis of the relation between the burnup and the release rate of the fission product gas.

The effect of the increase of the average crystal grain size is further demonstrated by FIG. 5, which relates to an analytical example wherein the relationship between the burnup and the release rate of the fission product gases were determined when the fuel assembly of the present invention and a conventional fuel assembly were continuously irradiated to a burnup of about 55 GWd/t. From FIG. 5, it appears that a latent period exists before the fission product gases are released in the conventional fuel assembly. The fission product gas release rate in the fuel assembly of the present invention is higher than that of the conventional fuel assembly as long as the burnup is low, but it decreases more than the conventional fuel assembly as the burnup release rate increases. The fuel rods of the present invention have a release rate of a fission product gas which is 30% smaller than that of the conventional example in the case of a burnup of about 55 GWd/t, for example.

In the following there will be explained a relationship between the pressures $P_{He}$ and Prod shown in FIG. 4. As shown in FIG. 4, when the minimum value of the pressure Prod of the conventional example is set to 1, the pressure Prod changes to be about 1.4, about 1.1, about 1 (minimum value) and about 1.1, as the pressure $P_{He}$ changes to 1, 5, 10 and 15 atm, respectively. On the other hand, the pressure Prod of the fuel rods of the present invention changes to about 0.95, about 0.8, about 0.75 (minimum value), about 0.8, and about 0.9, as the pressure $P_{He}$ changes to 1, 5, 8, 10 and 15 atm, respectively. That is, in accordance with the present invention, the pressure Prod which is at approximately the same level as the conventional fuel rods, or less than that, is obtained over the broad range of $P_{He}$ of 1–15 atm. The He filling pressure that makes the value of the pressure Prod minimum is 10 atm in the conventional case, but is about 8 atm in the case of the present invention.

From the result of the welding experiments carried out by the inventors of the present invention, it was confirmed that control of the welding arc was difficult, the consumption of welding tools was significant and pores were formed in the welded area when the pressure inside the welding chamber is higher than 8 atm. Accordingly, it was confirmed that, when the pressure is higher than 8 atm, it was almost impossible to perform welding and the yield could not be increased.

Therefore, it appears from FIG. 4 that high burnup of the fuel assembly of the present invention can be expected by setting the average crystal grain size of the pellets to be 30–60 μm and by setting the pressure $P_{He}$ to 8 atm or less, while maintaining the same fuel integrity as the conventional fuel assembly. It is not necessary to add a new welding means or a separate process to pressurize the He gas, and as a result, the manufacturing cost of the fuel rods can be reduced. In addition, the air can be prevented from invading the welding chamber at the time of welding by setting the pressure $P_{He}$ to 1 atm or more.

In the first example, the average train grain size of the pellets is 30–60 μm, and the pressure $P_{He}$ is set to about 8 atm. Therefore, as mentioned above, the fuel integrity is improved as compared with the conventional example, so that a higher burnup can be expected and the manufacturing cost of the fuel rods can be reduced. Since the quantity of the high-priced He gas can be reduced, this also contributes to the reduction of the manufacturing cost. As for the average crystal grain size of the pellet, a 35–55 μm range is more desirable.

Figure 7:
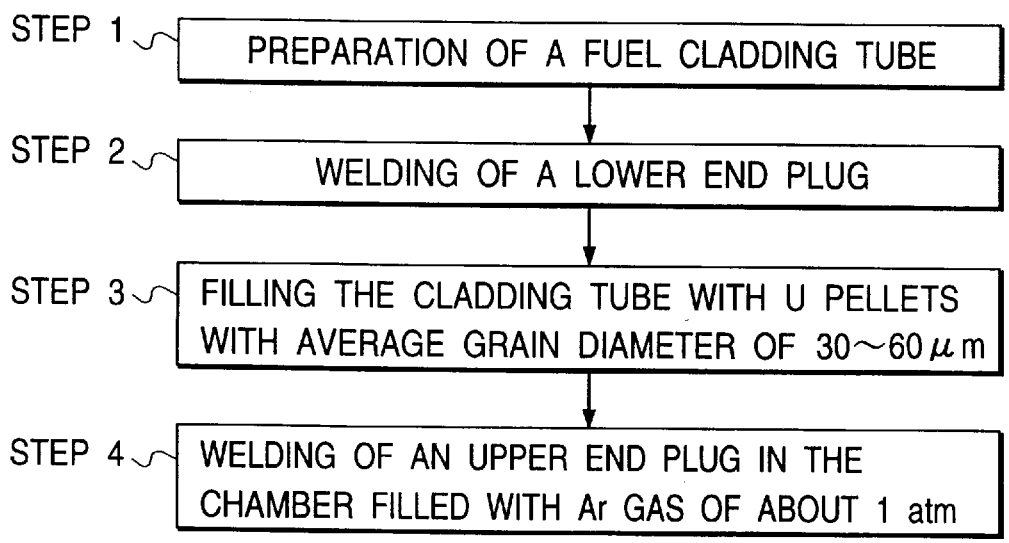
FIG. 7 is a diagram showing a method of manufacturing the fuel rods of FIG. 6.
Figure 6:
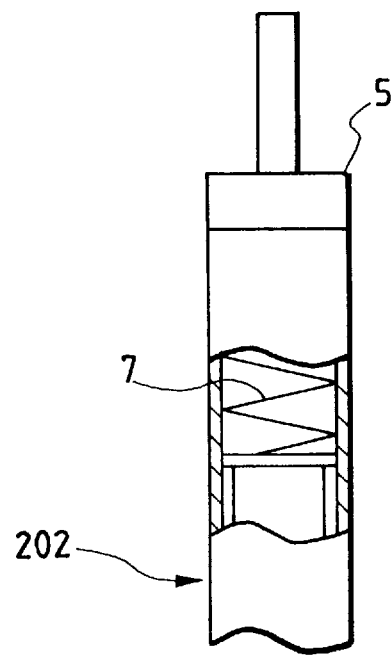
FIG. 6 is a partially broken-away side view of a second example of the fuel rods of the present invention.
Figure 6:
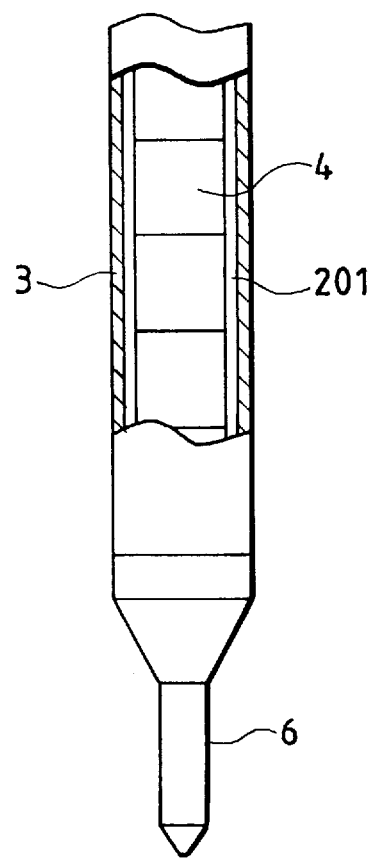

The second example of the present invention will be explained by reference to FIG. 6 and 7. FIG. 6 is a partially broken-away side view of the second example of a fuel rod according to the present invention. FIG. 7 is a diagram showing a method of manufacturing the fuel rod of FIG. 6. This example is concerned with fuel rods in which Ar gas is filled in the cladding tube. In step 1 of FIG. 7, a cladding tube 3 made of a zirconium alloy is prepared. In step 2, the lower end plug 6 is welded to the fuel cladding tube 3. In step 3, a plurality of U pellets 4 whose average crystal grain size is in the range of 30–60 μm are filled in cladding tube 3. In step 4, Ar gas 201 in the welding chamber is substituted for the gas in the cladding tube 3, and the pressure of the Ar gas is set to about 1 atm. An upper end plug 5 is welded to the fuel cladding tube 3, and the fuel rods 202 are sealed off, the U pellets 4 being held by a spring 7 in the chamber, which is filled with about 1 atm of Ar gas. As a result, the internal space of the fuel rod 202 is filled with about 1 atm of Ar gas 201 at room temperature.

Figure 8:
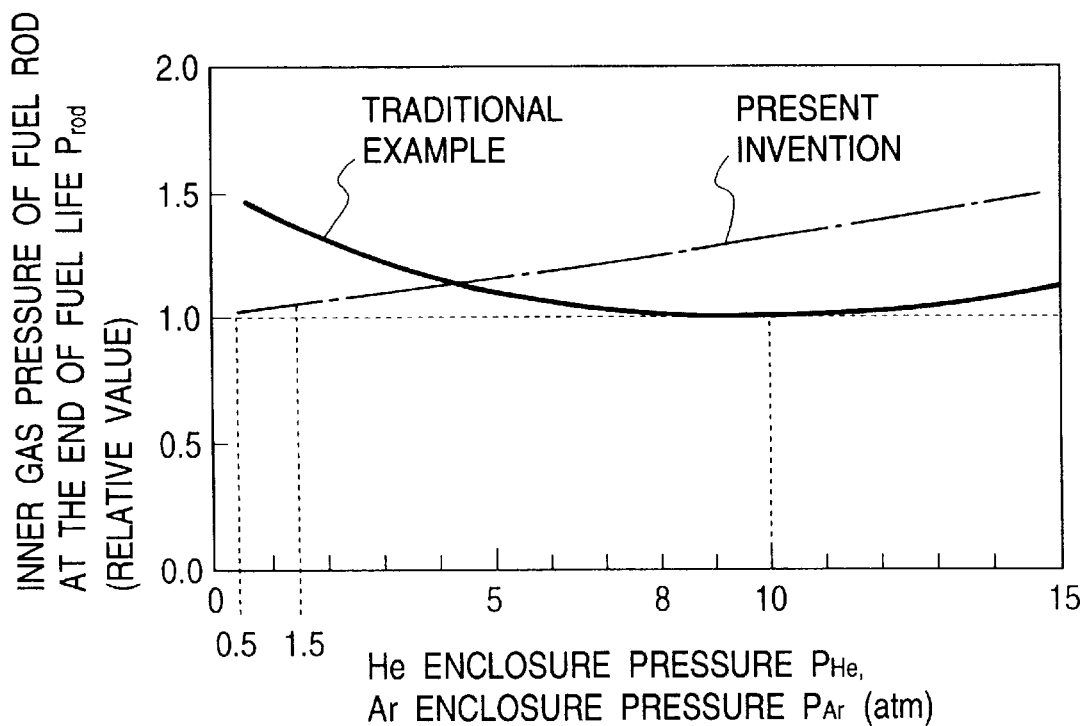
FIG. 8 is a diagram showing an example of an analysis of the relation between the filling pressure of He or Ar and the inner pressure of the fuel rod at the end of fuel life.

FIG. 8 relates to an analytical example wherein the fuel assembly including fuel rods filled with U pellets having an average crystal grain size of 30–60 μm (the present invention) and the conventional example shown in FIG. 4 were burned to a burnup of about 55 GWd/t. As shown in FIG. 8, the pressure Prod, which represents the inner pressure of the fuel rods at the end of fuel life, simply increases as the pressure $P_{Ar}$, which represents the filling pressure of the Ar gas (hereinafter referred to as Ar filling pressure) at the time of manufacturing the fuel rods increases, when argon gas is used. This is because the heat transfer rate of Ar is as low as about ⅛ of the heat transfer rate of He. That is, when the pressure $P_{Ar}$ changes to 0.5, 1, 1.5, 5 and 10 atm, when the minimum value of the pressure Prod of the conventional example is set to 1, the pressure Prod of the present invention changes to about 1.03, 1.04, 1.05, 1.15 and 1.3, respectively.

From FIG. 8, a pressure Prod having the same level as the minimum value of Prod of the conventional example is obtained by setting the $P_{Ar}$ to 1.5 atm or less. In addition, the pressure $P_{Ar}$ of 1.5 atm or less does not require an additional new welding means and an addition of a separate pressurizing process, so that the manufacturing cost can be reduced. When the pressure $P_{Ar}$ is set to 0.5 atm or more, the fuel rods can be manufactured by relatively simple gas exhaustion equipment, and so an increase in manufacturing cost can be avoided. In addition, the air can be prevented from invading the welding chamber at the time of welding by setting the pressure $P_{Ar}$ to 1 atm or more. In the second example, the average crystal grain size of the pellets was set to 30–60 μm and the pressure $P_{Ar}$ was set to about 1 atm, so that high burnup can be expected, and the manufacturing cost of the fuel rods can be reduced, while maintaining a fuel integrity at the same level as that of conventional example. In addition, use of Ar gas, that is cheaper than He gas, also contributes to the reduction of the manufacturing cost.

Figure 10:
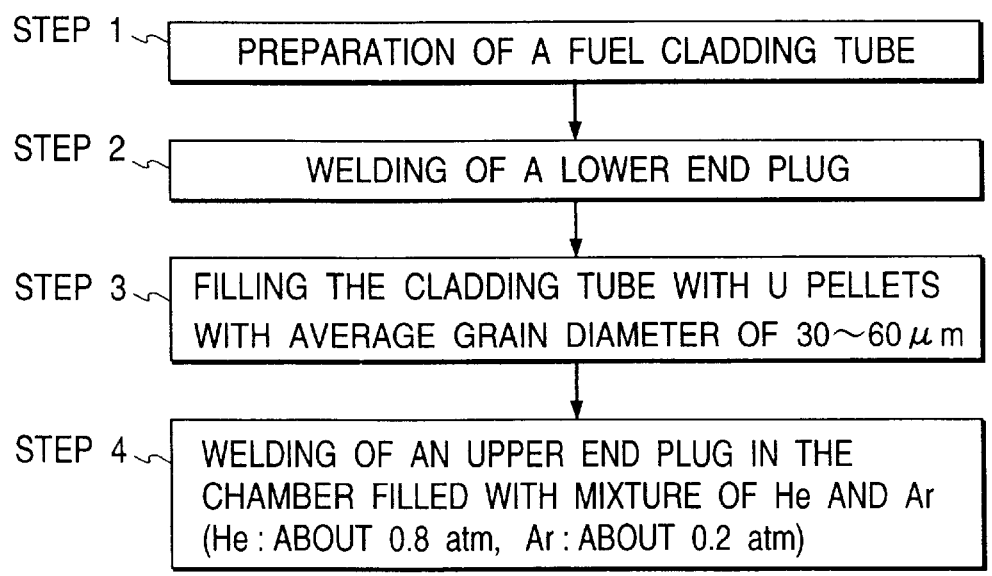
FIG. 10 is a diagram showing a method of manufacturing the fuel rod of FIG. 9.
Figure 9:
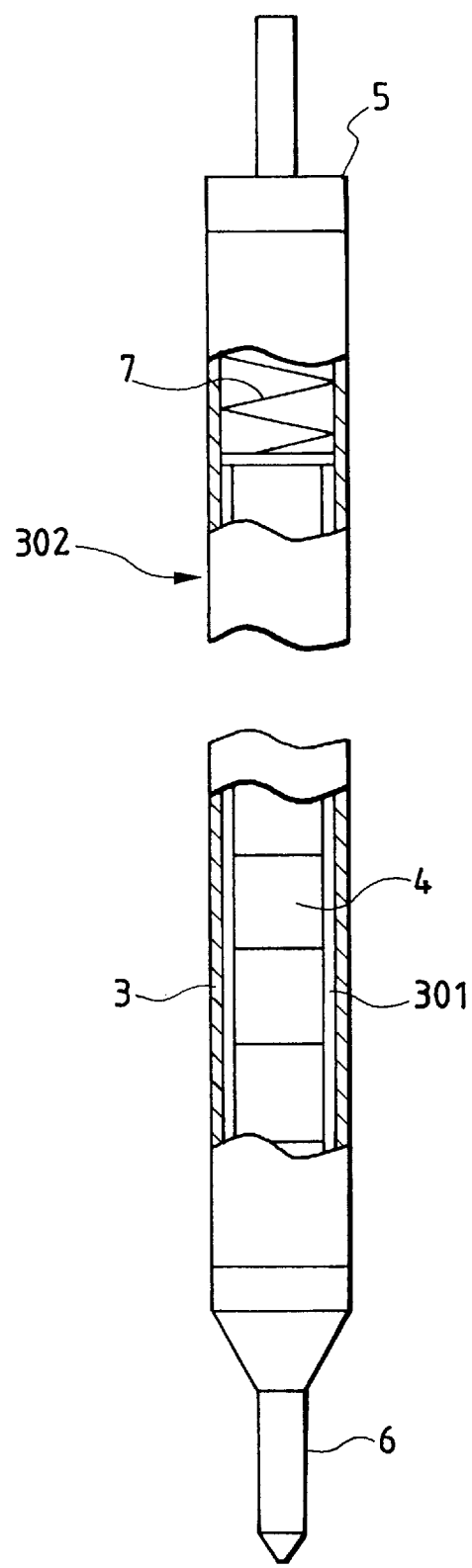
FIG. 9 is a partially broken-away side view of a third example of the fuel rod of the present invention.

The third example of the present invention will be explained by reference to FIGS. 9 and 10. FIG. 9 is a partially broken-away side view of the third example of a fuel rod according to the present invention. FIG. 10 is a diagram showing a method of manufacturing the fuel rod shown in FIG. 9. This example is concerned with fuel rods in which a gas mixture of He and Ar was filled in the cladding tube. In step 1 of FIG. 10, a cladding tube 3 made of zirconium alloy is prepared. In step 2, a lower end plug 6 is welded to the fuel cladding tube 3. In step 3, a plurality of U pellets 4 having an average crystal grain size of 30–60 μm are filled in the cladding tube 3. In step 4, in a welding chamber, the mixed gas 301 of He and Ar is substituted for the internal gas of the fuel cladding tube 3, and the pressure of the mixed gas is set to about 1 atm. In the mixed gas 301, the partial He gas pressure is about 0.8 atm and that of Ar gas is about 0.2 atm. In the chamber in which the mixed gas at about 1 atm is filled, U pellets 4 are held by a spring 7, the upper end plug 5 is welded to the fuel cladding tube 3, and the fuel rod 302 is thereby sealed off. Through this procedure, the internal space of fuel rod 302 is filled to about 1 atm with the mixed gas 301 at room temperature.

In the fuel rod 302 of this example, the He gas with a high heat conduction rate replaces part of Ar gas of the fuel rods 202 of the second example. In this example, the inner pressure Prod of the fuel rods at the end of fuel life decreases further than in the case of the second example, because the pellet temperature becomes lower than the second example, and the generation of a fission product gas is suppressed. That is, even in this example, as in the second example, it is possible to reduce the manufacturing cost of the fuel rods and expect a high burnup of the nuclear fuel, while maintaining the fuel integrity to the same degree as the conventional case. The air can be prevented from invading the welding chamber at the time of welding because the pressure of the mixed gas is about 1 atm.

While the filling pressure (hereinafter referred to as a mixed gas filling pressure) of the mixed gas at the time of manufacturing the fuel rods is about 1 atm in this example, it is apparent that the same result can be obtained when the total pressure of the mixed gas is set to 1–8 atm and the partial pressure of Ar is set to 1.5 atm or less, taking into consideration the effects of the first and second examples.

That is, when the total pressure of the mixed gas is in the range of 1~1.5 atm, the use of the mixed gas is equivalent to the replacement of a part of the Ar gas in Example 2 with He gas having a high heat conductive rate. When the total pressure of the mixed gas is higher than 1.5 atm, the use of the mixed gas is equivalent to the replacement of a part of the He gas in Example 1 with Ar gas having a low heat conductive rate, but the pressure Prod is repressed to the same level or less as that of the conventional example. In the three examples mentioned above, the U pellets that consist of $UO_2$ were filled in the fuel rods, but the present invention also can be applied to the case where gadolinia is added to the U pellets.

What is claimed is:

1. A fuel rod having a cladding tube, an upper end plug and a lower end plug that seal the upper and the lower ends of the cladding tube, respectively, and nuclear fuel pellets and helium gas filled in the cladding tube, the average crystal grain size of said nuclear fuel pellets being in the range of 30–60 $\mu$m, and the pressure of the helium gas being in the range of 1–8 atm.

2. A fuel rod having a cladding tube, an upper end plug and a lower end plug that seal the upper and lower ends of the cladding tube, respectively, and nuclear fuel pellets and argon gas filled in the cladding tube, the average crystal grain size of said nuclear fuel pellets being in the range of 30–60 $\mu$m, and the pressure of the argon gas being in the range of 0.5–1.5 atm.

3. The fuel rod as defined in claim 2, wherein the pressure the argon gas is in the range of 1–1.5 atm.

4. A fuel rod having a cladding tube, an upper end plug and a lower end plug that seal the upper and lower ends of the cladding tube, respectively, and nuclear fuel pellets and a mixed gas of helium and argon filled in the cladding tube, the average crystal grain size of the nuclear fuel pellets being in the range of 30–60 $\mu$m and the total pressure of the mixed gas of helium and argon being in the range of 1–8 atm, wherein the partial pressure of argon in the mixed gas is 1.5 atm or less.

5. A fuel assembly having a plurality of fuel rods each having a cladding tube, an upper end plug and a lower end plug that seal the upper and the lower ends of the cladding tube, respectively, nuclear fuel pellets and helium gas being filled in the cladding tube; and an upper tie plate and a lower tie plate that support the upper and lower ends of the fuel rods, respectively, the average crystal grain size of said nuclear fuel pellets being in the range of 30–60 $\mu$m, and pressure of the helium gas being in the range of 1–8 atm.

6. A fuel assembly having a plurality of fuel rods each having a cladding tube, an upper end plug and a lower end plug that seal the upper and the lower ends of the cladding tube, respectively, nuclear fuel pellets and argon gas being filled in the cladding tube; and an upper tie plate and a lower tie plate that support the upper and lower ends of the fuel rods, respectively, the average crystal grain size of said nuclear fuel pellets being in the range of 30–60 $\mu$m, and the pressure of the argon gas being in the range of 0.5–1.5 atm.

7. A fuel assembly having a plurality of fuel rods each having a cladding tube, an upper end plug and a lower end plug that seal the upper and lower ends of the cladding tube, respectively, nuclear fuel pellets and a mixed gas of helium and argon gas being filled in the cladding tube; and an upper tie plate and a lower tie plate that support the upper and lower ends of the fuel rods, respectively, the average crystal grain size of said nuclear fuel pellets being in the range of 30–60 $\mu$m and the total pressure of the mixed gas being in the range of 1–8 atm, wherein the partial pressure of argon in the mixed gas is 1.5 atm or less.

8. A method of manufacturing a fuel rod comprising the steps of:

welding a lower end plug to a lower end of a cladding tube;

filling the cladding tube with nuclear fuel pellets having an average crystal grain size in the range of 30–60 $\mu$m; and welding an upper end plug to the upper end of the cladding tube under the condition that helium gas at a pressure in the range of 1–8 atm is filled in the cladding tube.

9. A method of manufacturing a fuel rod comprising the steps of:

welding a lower end plug to a lower end of a cladding tube;

filling the cladding tube with nuclear fuel pellets having an average crystal grain size in the range of 30–60 $\mu$m; and welding an upper end plug to the upper end of the cladding tube under the condition that argon gas at a pressure in the range of 0.5–1.5 atm is filled in the cladding tube.

10. A method of manufacturing a fuel rod having a cladding tube, pellets of nuclear fuel filled in the cladding tube, and upper and lower end plugs that seal the respective ends of the cladding tube, comprising the steps of;

welding the lower end plug to the cladding tube;

filling the cladding tube with nuclear fuel pellets having an average crystal grain size of 30–60 $\mu$m;

filling a mixed gas of helium and argon in the cladding tube at a pressure of 1–8 atm, wherein the partial pressure of argon is 1.5 atm or less; and welding the upper end plug to the upper end of the cladding tube under the condition that the total pressure and the partial pressure of the mixed gas are maintained.

11. The fuel rod as defined in claim 1, wherein the average crystal grain size of said nuclear fuel pellets is in a range of 35–55 $\mu$m.

12. The fuel rod as defined in claim 2, wherein the average crystal grain size of said nuclear fuel pellets is in a range of 35–55 $\mu$m.

13. The fuel rod as defined in claim 4, wherein the average crystal grain size of said nuclear fuel pellets is in a range of 35–55 $\mu$m.

14. The fuel rod as defined in claim 1, wherein the nuclear fuel pellets each consist essentially of $UO_2$ alone or $UO_2$ and gadolinia.

15. The fuel rod as defined in claim 1, wherein the nuclear fuel pellets each consist of $UO_2$ alone or $UO_2$ and gadolinia.

16. The fuel rod as defined in claim 2, wherein the nuclear fuel pellets each consist essentially of $UO_2$ alone or $UO_2$ and gadolinia.

17. The fuel rod as defined in claim 2, wherein the nuclear fuel pellets each consist of $UO_2$ alone or $UO_2$ and gadolinia.

18. The fuel rod as defined in claim 4, wherein the nuclear fuel pellets each consist essentially of $UO_2$ alone or $UO_2$ and gadolinia.

19. The fuel rod as defined in claim 4, wherein the nuclear fuel pellets each consist of $UO_2$ alone or $UO_2$ and gadolinia.

* * * * *